United States Patent
Araki et al.

(10) Patent No.: US 8,693,599 B2
(45) Date of Patent: Apr. 8, 2014

(54) WIRELESS RECEIVING APPARATUS

(75) Inventors: Kiyomichi Araki, Tokyo (JP); Noriaki Saito, Tokyo (JP); Tadashi Morita, Kanagawa (JP)

(73) Assignee: Panasonic Corporation, Osaka (JP)

( * ) Notice: Subject to any disclaimer, the term of this patent is extended or adjusted under 35 U.S.C. 154(b) by 12 days.

(21) Appl. No.: 13/511,276

(22) PCT Filed: Sep. 6, 2010

(86) PCT No.: PCT/JP2010/005463
§ 371 (c)(1),
(2), (4) Date: May 22, 2012

(87) PCT Pub. No.: WO2011/077611
PCT Pub. Date: Jun. 30, 2011

(65) Prior Publication Data
US 2012/0230452 A1    Sep. 13, 2012

(30) Foreign Application Priority Data
Dec. 25, 2009    (JP) .................................. 2009-295554

(51) Int. Cl.
*H04L 27/06*    (2006.01)

(52) U.S. Cl.
USPC ........... 375/346; 375/340; 375/316; 375/259; 375/260; 375/285; 375/347; 343/876; 343/861; 343/893; 343/833; 343/844; 343/912; 343/703; 455/272; 455/132; 455/101; 455/137; 455/273; 455/176.1; 455/550.1; 455/277.1; 455/277.2; 370/487

(58) Field of Classification Search
USPC ......... 375/340, 316, 259, 260, 267, 346, 285; 343/876, 861, 893, 833, 844, 912, 703; 370/487; 455/272, 132, 101, 137, 269, 455/273, 276.1, 550.1, 277.1, 277.2
See application file for complete search history.

(56) References Cited

U.S. PATENT DOCUMENTS 6,075,823 A *    6/2000    Sonoda .................. 375/267
6,900,775 B2 *    5/2005    Shapira ................. 343/844

(Continued)

FOREIGN PATENT DOCUMENTS

| JP | 2001-223623 A | 8/2001 |
|----|---------------|--------|
| JP | 2001-313596 A | 11/2001 |

(Continued)

OTHER PUBLICATIONS

F.Adachi,"A Periodic Switching Diversity Technique for a Digital FM Land Mobile Radio", IEEE Transactions on Vehicular Technology, vol. VT-27, No. 4, Nov. 1978, P211-P219.

(Continued)

*Primary Examiner* — Siu Lee
(74) *Attorney, Agent, or Firm* — Pearne & Gordon LLP

(57) ABSTRACT

Disclosed is a wireless receiving apparatus, whereby inter-antenna interference can be reduced without inducing an increase of a mounting area due to an increase of the number of antennas, and the number of RFIC input terminals, circuit scale and power consumption can be reduced. In the wireless receiving apparatus (100), when a receiving antenna (110-1) and a down-converter (130) are connected with a multiplexer (120) therebetween, a capacity control unit (190-2) controls the capacity value of the capacity-variable parasitic element (180-2) connected to the receiving antenna (110-2) such that the communication capacity of the receiving antenna (110-1) is maximum. Furthermore, when the receiving antenna (110-2) and the down-converter (130) are connected with the multiplexer (120) therebetween, the capacity control unit (190-1) controls the capacity value of the capacity-variable parasitic element (180-1) connected to the receiving antenna (110-1) such that the communication capacity of the receiving antenna (110-2) is maximum.

6 Claims, 7 Drawing Sheets

(56) References Cited

U.S. PATENT DOCUMENTS

| | | | |
|---|---|---|---|
| 8,181,875 | B2 | 5/2012 | Nishido |
| 8,405,567 | B2* | 3/2013 | Park et al. ............ 343/833 |
| 2002/0025778 | A1* | 2/2002 | Lee ............... 455/3.05 |
| 2005/0064824 | A1* | 3/2005 | Bergervoet et al. ...... 455/101 |
| 2005/0176380 | A1* | 8/2005 | Okabe et al. ............ 455/73 |
| 2005/0206573 | A1* | 9/2005 | Iigusa et al. ............ 343/770 |
| 2006/0099925 | A1* | 5/2006 | Tsai et al. ............ 455/272 |
| 2007/0280297 | A1 | 12/2007 | Nakatani et al. |
| 2008/0062065 | A1 | 3/2008 | Yamamoto et al. |
| 2008/0292008 | A1 | 11/2008 | Kondo et al. |
| 2009/0267842 | A1 | 10/2009 | Takagi et al. |

FOREIGN PATENT DOCUMENTS

| | | |
|---|---|---|
| JP | 2002-290298 A | 10/2002 |
| JP | 2003-188783 A | 7/2003 |
| JP | 2005-512389 A | 4/2005 |
| JP | 2005-151194 A | 6/2005 |
| JP | 2005-260762 A | 9/2005 |
| JP | 2006-135814 A | 5/2006 |
| JP | 2006-324984 A | 11/2006 |
| JP | 2007-243455 A | 9/2007 |
| JP | 2007-325220 A | 12/2007 |
| JP | 2007-536767 A | 12/2007 |
| JP | 2008-72704 A | 3/2008 |
| JP | 2008-211586 A | 9/2008 |
| WO | 2007/094050 A1 | 8/2007 |

OTHER PUBLICATIONS

Makoto Taroumaru, "Fast Antenna Switching for Diversity and Adaptive Beamforming with a Single Receiver Circuit", IEICE Technical Report, Oct. 2005.

International Search Report for PCT/JP2010/005463 dated Nov. 30, 2010.

\* cited by examiner

|  | HIGH | LOW |
|---|---|---|
| LOW | MIMO | SIMO (MAXIMUM RATIO COMBINING) |
| HIGH | SISO | SISO |

INTERFERENCE WAVE LEVEL DETECTION

DESIRED WAVE LEVEL DETECTION

FIG.7

WIRELESS RECEIVING APPARATUS

TECHNICAL FIELD

The present invention relates to a wireless receiving apparatus and, in particular, to a wireless receiving apparatus for use in a MIMO (multiple-input multiple-output) system or SIMO (single-input multiple-output) system.

BACKGROUND ART

MIMO (multiple-input multiple-output) transmission technology is becoming essential as a next-generation wireless communication technology due to its spatial multiplexing and diversity effects. For its mounting, however, a system that mounts a plurality of transmitting/receiving apparatuses and antennas with equivalent characteristics merely in parallel is a mainstream. As a result, there are two problems, i.e., increases in the numbers of input terminals, chip size and power consumption of RFIC (radio frequency integrated circuit), and insufficient isolation between the antennas.

Methods shown in Patent Literatures 1 and 2, and Non-Patent Literatures 1 and 2, for example, have been known as means for solving the first problem of increases in the numbers of input terminals, chip size and power consumption of RFIC caused by the parallel mounting. Thus conventional methods are used by switching a single RF (radio frequency) front end by the time for a plurality of antennas.

FIG. 1 is a block diagram showing the configuration of a conventional MIMO-enabled wireless receiving apparatus described in Patent Literature 1, hereinafter the explanation is focused to a case of the number N of branches being two for simplification.

The wireless receiving apparatus shown in FIG. 1 comprises an antenna array consisting of two receiving antennas 2101 and 2102 to receive RF signals, 2-to-1 multiplexer 2020, disposed at the output side of two receiving antennas 2101 and 2102, for multiplexing two channel signals into one output, down-converter 2140, disposed at the output side of 2-to-1 multiplexer 2020, for down-converting the RF signals to baseband, two 1-to-2 analog demultiplexers 2061 and 2062, disposed at the output side of the down converter, for demultiplexing each of two multiplexed received signals to an in-phase component and a quadrature component. respectively, and four low-pass filters, disposed at the output sides of the two 1-to-2 analog demultiplexers, for filtering and reconfiguring baseband signals with two in-phase components or two quadrature components.

In the wireless receiving apparatus, two signals received through two receiving antennas 2101 and 2102 are multiplexed into one output on a time division basis by 2-to-1 multiplexer 2020. The multiplexed signal is then down-converted to the baseband signal by down-converter 2140, and the in-phase component and the quadrature component are output. Each of the two received signals multiplexed and down-converted are demultiplexed to two in-phase components of the received signal and two quadrature components of the received signals by two 1-to-2 analog demultiplexers 2061 and 2062, respectively.

In such a manner, down-converter 2140 down-converts the multiplexed signal of the received signals in the wireless receiving apparatus. Thus, the wireless receiving apparatus has a simplified RF front end configuration that can reduce power consumption compared to a mainstream system of MIMO or SISO in which individual receivers mounted in parallel down-convert the multiplexed signal.

Methods described in, for example, Patent Literatures 3 to 10 are known as measures for solving the second problem of the insufficient isolation between the antennas. That is, a conventional method provided with passive antennas and variable reactance elements in proximity to feed antenna elements performs optimal control of an antenna radiation pattern. FIG. 2 is a block diagram showing a configuration of a conventional MIMO receiving antenna device described in the Patent Literature 3.

In MIMO receiving antenna device 3001 shown in FIG. 2, antenna elements at both sides among antenna elements arranged. in a row arc feed antenna elements 3011 and 3012. The other elements disposed between feed antenna elements 3011 and 3012 at the both sides are passive antenna elements 3021 and 3022. Passive antenna elements 3021 and 3022 are terminated by reactance elements 3031 and 3032. This method sets reactance values of reactance elements 3031 and 3032 to a value that maximizes the expectation value of communication capacity in wireless communication. This method can reduce antenna coupling between a plurality of feed antenna elements and can increase SNR. (Signal to Noise Ratio). The method can also reduce the spatial correlation between the feed antenna elements to increase the communication capacity.

CITATION LIST

Patent Literature

PTL 1
Japanese Patent Application Laid-Open No. 2006-135814
PTL 2
Japanese Patent Application Laid-Open No. 2007-325220
PTL 3
Japanese Patent Application Laid-Open No. 2008-211586
PTL 4
Japanese Patent Application Laid-Open No. 2005-151194
PTL 5
Japanese Patent Application Laid-Open No. 2001-313596
PTL 6
Japanese Translation of PCT Application Laid-Open No. 2007-536767
PTL 7
Japanese Patent Application Laid-Open No. 2007-243455
PTL 8
Japanese Patent Application Laid-Open No. 2005-260762
PTL 9
Japanese Patent Application Laid-Open No. 2008-072704
PTL 10
Japanese Translation of PCT Application Laid-Open No. 2005-512389

Non-Patent Literature

NPL 1
F. ADACHI, "A Periodic Switching Diversity Technique for a Digital FM Land Mobile Radio", IEEE TRANSACTIONS ON VEHICULAR TECHNOLOGY, VOL. VT-27, NO.4, NOVEMBER 1978, P211-P219
NPL 2
Makoto Taroumaru, "Fast Antenna Switching for Diversity and Adaptive Beamforming with a Single Receiver Circuit", IEICE Technical Report, October 2005

SUMMARY OF INVENTION

Technical Problem

However, as is analyzed in detail in NPL 2, configurations shown in PTL 1, PTL 2, NPL 1, and NPL 2 cause a decrease in communication capacity due to interference between a plurality of antennas. In addition, if passive antennas are newly added as disclosed in PTL 3 to PTL 10, the inter-antenna interference is reduced, but the time division concept is not introduced. Such configurations thus have disadvantages, that is, increases in the number of input terminals, circuit scale, and power consumption of the RFIC and also an increase in mounting area due to the necessity of loading a plurality of new passive antennas besides a plurality of ordinary feed antennas.

An object of the present invention is to provide a wireless receiving apparatus that can reduce inter-antenna interference without an increase in a mounting area due to an increased number of antennas, and can reduce the number of input terminals; circuit scale, and power consumption of RFIC.

Solution to Problem

A wireless receiving apparatus according to the present invention includes: a first receiving antenna and a second receiving antenna that convert arrival signals to received power; a capacity-variable parasitic element connected to the second receiving antenna; a down-converter that demodulates signals received by the first and second receiving antennas; a multiplexer that is disposed between the first and second receiving antennas and the down-converter and alternately switches the connection of the first or second receiving antenna and the down-converter in a shorter time than a symbol rate of a modulated signal included in the incoming signal; and a control section that controls a capacity value of the capacity-variable parasitic element connected to the second antenna so as to maximize communication capacity of the first receiving antenna when the first receiving antenna and the down-converter are connected.

Advantageous Effects of Invention

According to the present invention, the inter-antenna interference can be reduced without an increase in a mounting area due to an increased number of antennas, and the number of RFIC input terminals, circuit scale and power consumption can be reduced.

BRIEF DESCRIPTION OF DRAWINGS

FIG. 7 is a diagram showing the correspondence relationship between determined results in an Operation mode setting section and operation modes;

DESCRIPTION OF EMBODIMENTS

Embodiments of the present invention will now he described in detail with reference to drawings.

Embodiment 1

Figure 1:
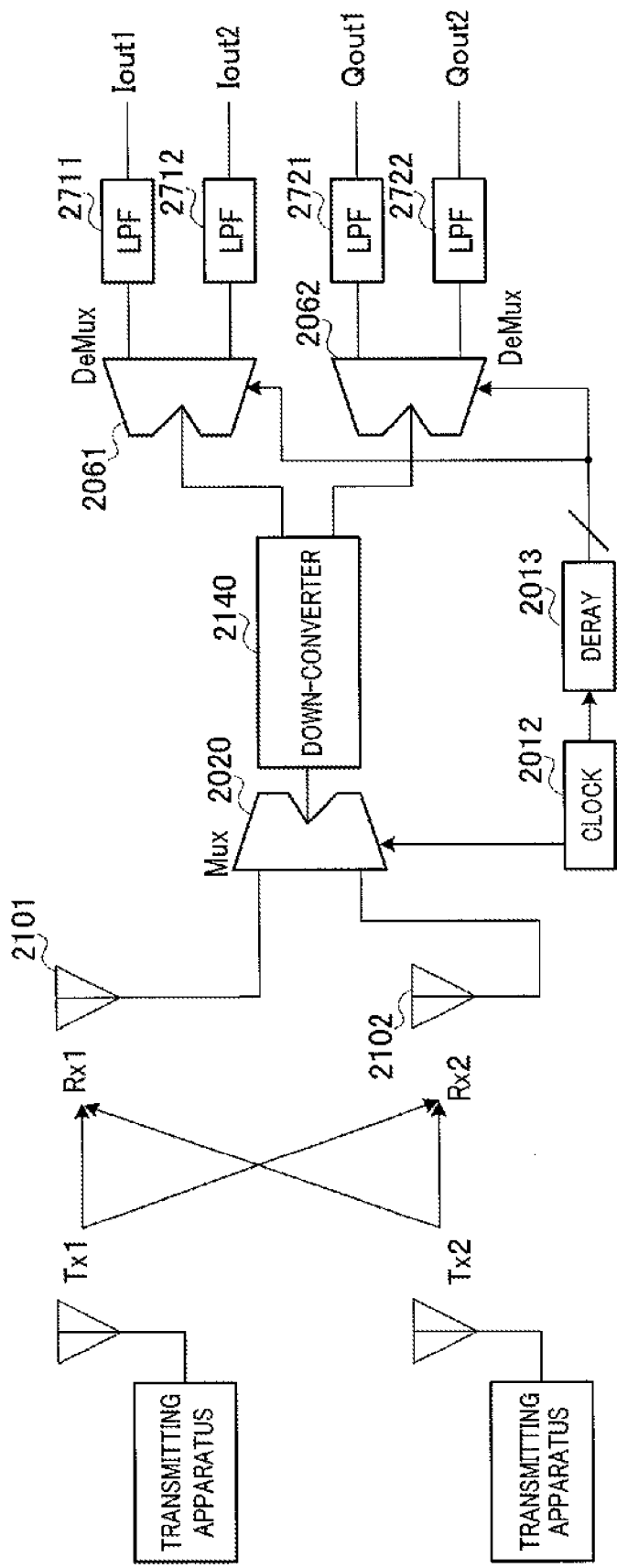
FIG. 1 is a block diagram illustrating a configuration of a conventional wireless receiving apparatus.
Figure 2:
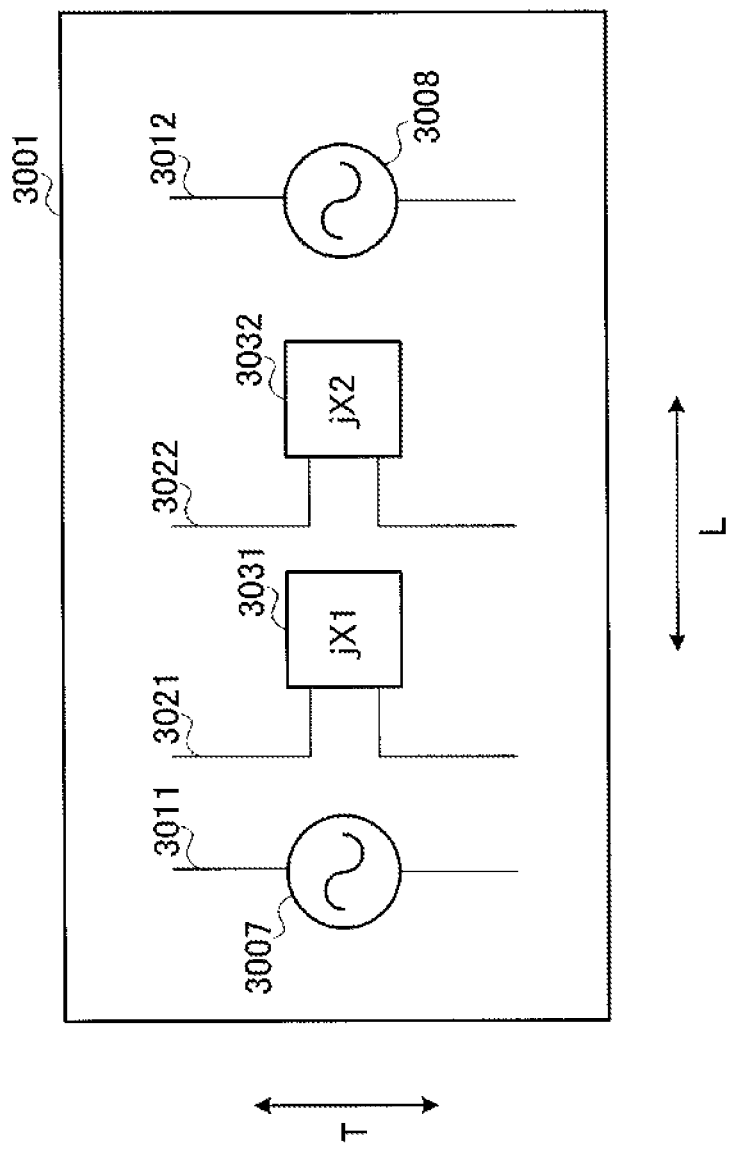
FIG. 2 is a block diagram of a MIMO antenna that reduces inter-antenna interference.
Figure 3:
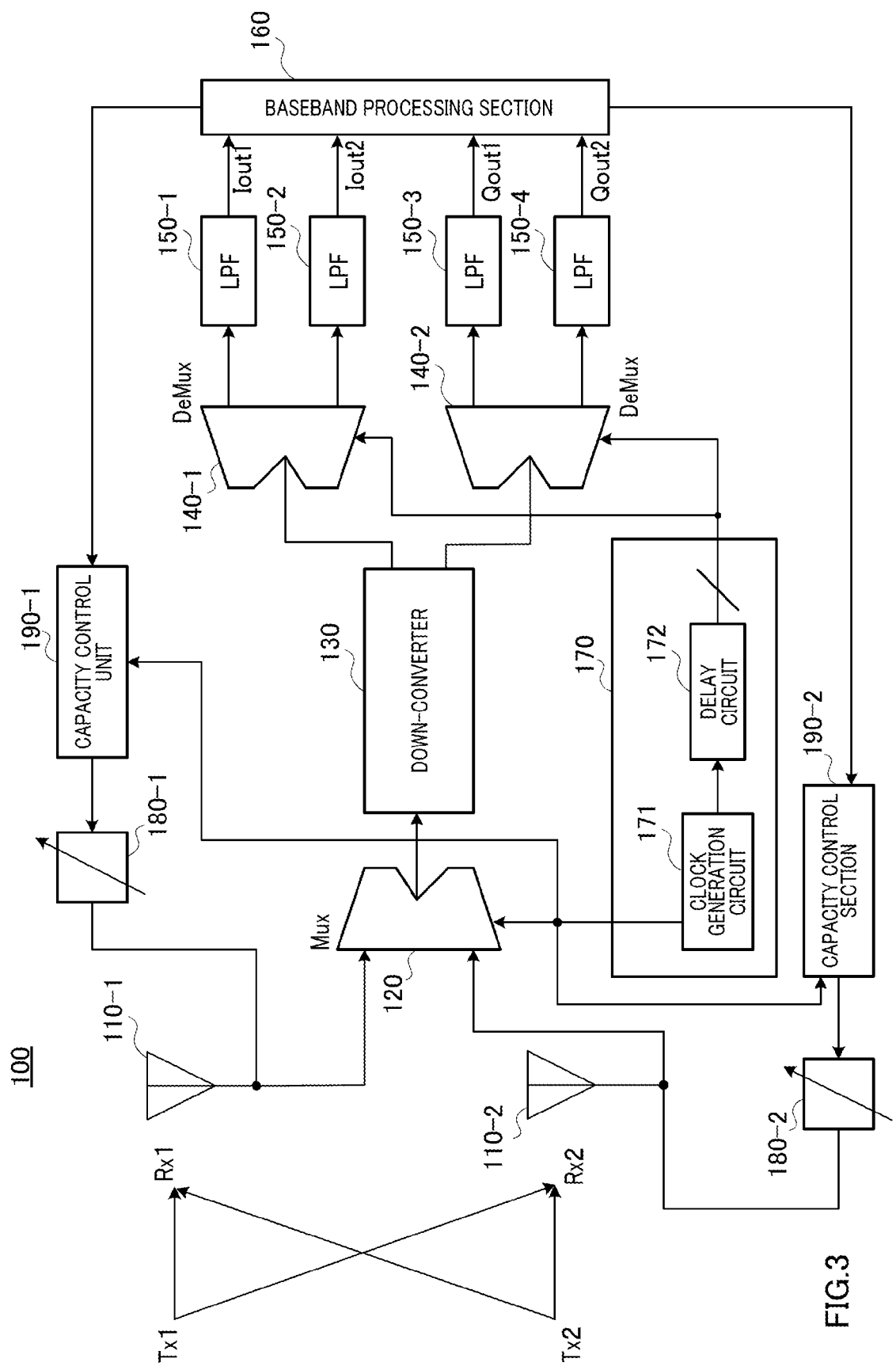
FIG. 3 is a block diagram illustrating a main configuration of a wireless receiving apparatus according to Embodiment 1 of the present invention.

FIG. 3 is a block diagram illustrating the main configuration of a wireless receiving apparatus according to an embodiment of the present invention. Wireless receiving apparatus 100 according to the embodiment shown in FIG. 3 is a configuration example in the case of the number N of branches being equal to two.

In FIG. 3, wireless receiving apparatus 100 includes two receiving antennas 110-1 and 110-2, multiplexer (Mux) 120, down-converter 130, demultiplexers (DeMux) 140-1 and 140-2, LPFs (low pass filters) 150-1, 150-2, 150-3 and 150-4, baseband processing section 160, switching control section 170, capacity-variable parasitic elements 180-1 and 180-2, and capacity control sections 190-1 and 1.90-2.

Two receiving antennas 110-1 and 110-2, which configure an antenna array, receive arrival signals. RF signals received at receiving antennas 110-1 and 110-2 are output to subsequent multiplexer 120. Hereinafter, the signal received by receiving antenna 110-1 is referred to as a first RF signal, and the signal received by receiving antenna 110-2 is referred to as a second RF signal.

Multiplexer 120, which is disposed at the output side of receiving antennas 110-1 and 110-2, multiplexes two channels of RF signals (the first and second RF signals) received by receiving antennas 110-1 and 110-2 into a single channel of RF signal. In detail, multiplexer 120 alternatively switches a receiving antenna element connected to down-converter 130 into receiving antennas 110-1 and 110-2 based on a first switching signal from switching control section 170 described later. Thus multiplexer 120 multiplexes the two RF signals received through two receiving antennas 110-1 and 110-2, thereby time-dividing the first and second RF signals to generate one output signal.

Thus it can be said that multiplexer 120 is equivalent to a time-division switch. This means multiplexer 120 can be configured by switches such as two MOSFETs (Metal Oxide Semiconductor Field Effect Transistors). If the number of branches is equal to N (N is an integer of three or more), it should be configured so that multiplexer 120 has N switches.

Multiplexer 120 outputs one channel of the multiplexed RF signal to down-converter 130.

Down-converter 130, which is disposed at the output side of multiplexer 120, down-converts the one channel of the multiplexed RF signal to a baseband signal, and demodulates received power converted by receiving antennas 110-1 and 110-2. Down-converter 130 then outputs an in-phase component of the baseband signal to demultiplexer (DeMux) 140-1, and outputs a quadrature component of the baseband signal to demultiplexer 140-2.

Demultiplexer 140-1 is disposed at the in-phase side of down-converter 130, and the in-phase component of the baseband signal multiplexed into one channel is input to demultiplexer 140-1. Demultiplexer 140-2 is also disposed at the quadrature side of down-converter 130, and the quadrature component of the baseband signal multiplexed into one channel is input to demultiplexer 140-2.

Demultiplexers 140-1 and 140-2 demultiplex (separate) the in-phase component of the baseband signal having one channel to two channels of in-phase components based on a second switching signal from switching control section 170. Similarly, demultiplexer 140-2 demultiplex the quadrature component of the baseband signal having one channel to two channels of quadrature components.

Demultiplexers 140-1 and 140-2 output the in-phase components and the quadrature components of the two channels of multiplexed baseband signals to LPFs 150-1, 150-2, 150-3 and 150-4, respectively.

LPFs 150-1 and 150-2, which are disposed at the output side of demultiplexer 140-1, perform filtering processing on the in-phase components of the baseband signals and reconfigure the demodulated signals. LPFs 150-3 and 150-4, which are disposed at the output side of demultiplexer 140-2, also perform filtering processing on the quadrature components of the baseband signals and reconfigure demodulated signals. LPFs 150-1 and 150-3 output the in-phase component (Iout1) and the quadrature component (Qout1) after reconfiguring associated with the first RF signal to baseband processing section 160, respectively. LPFs 150-2 and 150-4 also output the in-phase component (Iout2) and the quadrature component (Qout2) after reconfiguring associated with the second RF signal to baseband processing section 160, respectively.

Baseband processing section 160 calculates the communication capacity using the in-phase components and the quadrature components associated with the first RF signal and the second RF signal. Baseband processing section 160, for example, calculates the communication capacity C based on Equation (1). Equation (1) is derived from Shannon's theorem.

(Equation 1)

$$C = \log_2 \left| I_{nR} + \frac{SNR}{n_T} HH^H \right| \quad [1]$$

In Equation (1), $n_T$ is the number of transmitting antennas, and $I_{nR}$ is a unit matrix of which the size is $n_R$. Herein, $n_R$ is the number of receiving antennas. SNR is a signal-to-noise power ratio, and H is a channel matrix. The channel matrix reflects the directionality in accordance with a radiation pattern of receiving antennas 110-1 and 110-2.

Baseband processing section 160 outputs calculated information on communication capacity to capacity control sections 190-1 and 190-2.

Switching control section 170 has clock generation circuit 171 and delay circuit 172, provides the first switching signal to multiplexer 120 and the second switching signals to demultiplexers 140-1 and 140-2.

Clock generation circuit 171 generates a clock signal with a predetermined period, and outputs the generated clock signal as the first switching signal to multiplexer 120. Clock generation circuit 171 outputs the generated clock signals (the first switching signals) to delay circuit 172 and capacity control sections 190-1 and 190-2. The clock cycle of the clock signal (the first switching signal) generated by clock generating circuit 171 is described later.

Delay circuit 172 delays the clock signal (the first switching signal) generated by clock generating circuit 171, and outputs as the second switching signal to demultiplexers 140-1 and 140-2. The delay time of delay circuit 172 is set in view of the delay time until the RF signal output from multiplexer 120 is converted to the baseband signal by down-converter 130 and reach demultiplexers 140-1 and 140-2.

Capacity-variable parasitic elements 180-1 and 180-2, respectively, are connected to receiving antennas 110-1 and 110-2 and change their capacity values in response to control signals from capacity control sections 190-1 and 190-2.

Capacity control sections 190-1 and 190-2 control capacity values of capacity-variable parasitic elements 180-1 and 180-2, respectively, based on communication capacity information reported from baseband processing section 160. Method of controlling the capacity values of capacity-variable parasitic elements 180-1 and 180-2 in capacity control sections 190-1 and 190-2, respectively, is described later.

The operation of wireless receiving apparatus 100 having the configuration described above will now be explained.

In wireless receiving apparatus 100, the first and second RF signals received through two receiving antennas 110-1 and 110-2 are multiplexed into one output on a time division basis by multiplexer 120.

In detail, multiplexer 120 switches connection between receiving antennas 110-1 and 110-2 and down-converter 130 based on the first switching signal from switching control section 170. That is, the first RF signal received by receiving antenna 110-1 or the second RF signal received by receiving antenna 110-2 is alternately input to down-converter 130 in every clock cycle of the first switching signal.

In wireless receiving apparatus 100 according to the present embodiment, down-converter 130 is connected between mutiplexer 120 and demultiplexers 140-1 and 140-2 while down-converter 130 is time-divisionally operated based on the first switching signal. It is generally believed that a time-divisionally operated device preferably includes a circuit having no frequency characteristics, that is, having broad bandpass characteristics. It is also known that time-divisional operation of a circuit with frequency characteristics causes signals to leak between branches of two signal channels, and impairs demodulation performance. It is therefore preferred that down-converter 130 have broad bandpass characteristics.

At the downstream side of down-converter 130, demodulation of the first and second RF signals requires to be sampled at a time less than half the time of a symbol rate of modulated signals included in the first and second RF signals based on the sampling theorem. Wireless receiving apparatus 100 of the present embodiment switches signals to be input to down-converter 130 using multiplexer 120. That is, multiplexer 120 is required to switch at a time less than half the time of the symbol rate of the modulated signals included in the first and second RF signals. Thus, the clock rate of the first switching signal is preferably more than twice the symbol rate of the modulated signals included in the first and second RF signals. It is desirable for mutiplexer 120 to switch at a rate more than a received frequency bandwidth. In the case of Band 1 of 3GPP (3rd Generation Partnership Project) Specification, for example, the received frequency bandwidth is 60 MHz. Assuming that the switching rate of multiplexer 120 is more than 60 MHz, the sampling theorem therefore is satisfied even if the received frequency bandwidth varies.

The first switching signals are input from switching control section 170 to capacity control sections 190-1 and 190-2. Multiplexer 120 alternately connects receiving antennas 110-1 and 110-2 to down-converter 130 based on the first switching signal. Capacity control sections 190-1 and 190-2 can determine which receiving antenna 110-1 or 110-2 is connected to down-converter 130, based on each first switching signal input.

At the beginning, a period is discussed in which receiving antenna 110-1 is connected to down-converter 130 by multiplexer 120.

In this period, receiving antenna 110-2 is not connected to down-converter 130, but is separated from down-converter 130. That is, in the period, receiving antenna 110-1, which is connected to down-converter 130, defines a feed antenna, while receiving antenna 110-2, which is not connected to down-converter 130, defines a passive antenna.

The present embodiment focuses attention on the fact that the feed antenna and the passive antenna are defined when receiving antennas connected to down-converter 130 are switched on a time division basis by multiplexer 120. A receiving antenna that is not connected to down-converter 130 by multiplexer 120 thus functions as the passive antenna.

The present embodiment controls the radiation pattern of a receiving antenna (a first receiving antenna) defining the feed antenna by controlling the capacity value of a capacity-variable parasitic element (a second capacity-variable parasitic element) connected to the receiving antenna (a second receiving antenna) defining the passive antenna. This enables the present embodiment to control the radiation pattern of the feed antenna with no additional passive antenna. The radiation pattern affects the channel matrix. Communication capacity also varies according to the channel matrix as shown in Equation (1). According to the present embodiment, the capacity value of the second capacity-variable parasitic element is therefore controlled so as to maximize the communication capacity of the first receiving antenna. In the present embodiment, SNR of the first receiving antenna can thus he increased using antenna connection or spatial correlation between the first and second receiving antennas.

In detail, capacity control section 190-2 controls the capacity value of the capacity-variable parasitic element 180-2 connected to receiving antenna 110-2 while multiplexer 120 defines receiving antenna 110-2 as the passive antenna. This enables receiving antenna 110-2 defining the passive antenna to control the radiation pattern of receiving antenna 110-1 defining the feed antenna, wherein capacity control section 190-2 controls the radiation pattern of receiving antenna 110-1 by changing the capacity value of capacity-variable parasitic element 180-2 so as to maximize the communication capacity of receiving antenna 110-1 forming the feed antenna.

A period is then discussed in which multiplexer 120 connects receiving antenna 110-2 to down-converter 130. In this period, receiving antenna 110-1 is not connected to down-converter 130, but is separated from down-converter 130. In the period, receiving antenna 110-2, which is connected to down-converter 130, thus defines the feed antenna, and receiving antenna 110-1, which is not connected to down-converter 130, defines the passive antenna. In the period, capacity control section 190-1 controls the capacity value of capacity-variable parasitic element 180-1 connected to receiving antenna 110-1 so as to maximize the communication capacity of receiving antenna 110-2 defining the feed antenna.

The capacity values are, for example, controlled as follows: Capacity control sections 190-1 and 190-2 output control signals having output voltage values according to target capacity values to capacity-variable parasitic elements 180-1 and 180-2, respectively, wherein capacity control sections 190-1 and 190-2 determine the capacity values of capacity-variable parasitic elements 180-1 and 180-2 as target capacity values so as to maximize the communication capacity of receiving antennas 110-2 and 110-1, and capacity-variable parasitic elements 180-1 and 180-2 change the capacity values according to the output power value of the control signal from capacity control sections 190-1 and 190-2, respectively.

Among receiving antennas 110-1 and 110-2, a receiving antenna connected to down-converter 130 functions as a main antenna while a receiving antenna not connected to down-converter 130 functions as a secondary antenna. The main antenna and the secondary antenna are mutually switched in synchronization with the switching rate of multiplexer 120. That is, capacity-variable parasitic elements 180-1 and 180-2 have different capacity values when receiving antenna to be connected works as the main antenna or as the secondary antenna. Capacity-variable parasitic elements 180-1 and 180-2 thus have two different values for the main antenna and for the secondary antenna. That means the capacity values of capacity-variable parasitic elements 180-1 and 180-2 are switched between values for the main antenna. and for the secondary antenna in synchronization with the switching rate of multiplexer 120.

The update rate of each capacity value needs to be set greater than the Doppler frequency, but may be lower enough than the switching rate of multiplexer 120. The term "update rate of capacity value" means the rate of updating values themselves of two different capacity values for the main antenna and for the secondary antenna, and it differs from the switching rate of the capacity values. For example, the Doppler shift frequency of the Shinkansen (bullet train) travelling at a speed of 300 Km per hour using 2.4 GHz band is 667 Hz. In this case, the update rate of the capacity value is preferably set. several times (for example such as 1.334 KHz twice as much). Since reducing the size of switch is required to provide a high speed switch, equivalent series resistance increases and the Q value of capacity decreases in a conventional CMOS process, and characteristics is impaired. In the present embodiment, however, capacity-variable parasitic elements 180-1 and 180-2 can be configured using switches optimized for characteristics without being dominated by high-speed performance. As a result, capacity-variable parasitic elements 180-1 and 180-2 with high Q values can be configured without being affected by the switching rate of multiplexer 120 requiring ultra high-speed. One of the two different capacity values for the main antenna and for the secondary antenna may be set to zero to simplify control.

As described above, wireless receiving apparatus 100 according to the present embodiment can control the radiation pattern of the feed antenna using the passive antenna that is not operated time-divisionally. That is, while receiving antenna 110-2 defines the passive antenna, capacity control section 190-2 controls the capacity value of capacity-variable parasitic element 180-2 connected to receiving antenna 110-2 so as to maximize the communication capacity of receiving antenna 110-1. While multiplexer 120 defines receiving, antenna 110-1 as the passive antenna, capacity control section 190-1 controls the capacity value of capacity-variable parasitic element 180-1 connected to receiving antenna 110-1 so as to maximize the communication capacity of receiving antenna 110-2. Thus the present embodiment can increase the communication capacity with no additional parasitic antenna.

Wireless receiving apparatus 100 is described as a MIMO-enabled wireless receiving apparatus in the present embodiment, and wireless receiving apparatus 100 is also usable as a SIMO-enabled wireless receiving apparatus equipped with a single channel transmission system. In this case, two receiving antennas can provide diversity reception with maximum ratio combining. To achieve the full performance of MIMO or diversity reception with maximum ratio combining, two antenna must be separated by a sufficient distance to reduce interference (correlation) between the two antennas. However, portable devices with restricted space cannot keep a sufficient distance between two antennas, and they have inferior characteristics caused by theoretical characteristics. In contrast, the present embodiment is configured to improve transmission efficiency using mutual interference between two receiving antennas. As a result, two receiving antennas can be disposed in proximity so that the two receiving antennas interfere with each other, thereby downsizing the wireless receiving apparatus. The distance between the receiving antennas is optimal in the case of approximately one eighth of a wavelength. However, even if the distance between the receiving antennas is smaller, the present embodiment has an advantage that deterioration from the theoretical value is minimized, compared to ordinary MIMO or SIMO (diversity reception with maximum ratio combining).

According to the above description, while the second receiving antenna functions as the passive antenna, the capacity control section controls the capacity value of the second capacity-variable parasitic element so as to maximize the communication capacity of the first receiving antenna. However, the method of controlling the capacity value is not limited to this case. If the overall performance of the MIMO system is emphasized that uses each of the first and second receiving antennas as the main antenna on a time division basis, the capacity control section may control the capacity values of the first and second capacity-variable parasitic elements so as to maximize the communication capacity of the overall MIMO system.

Embodiment 2

Figure 4:
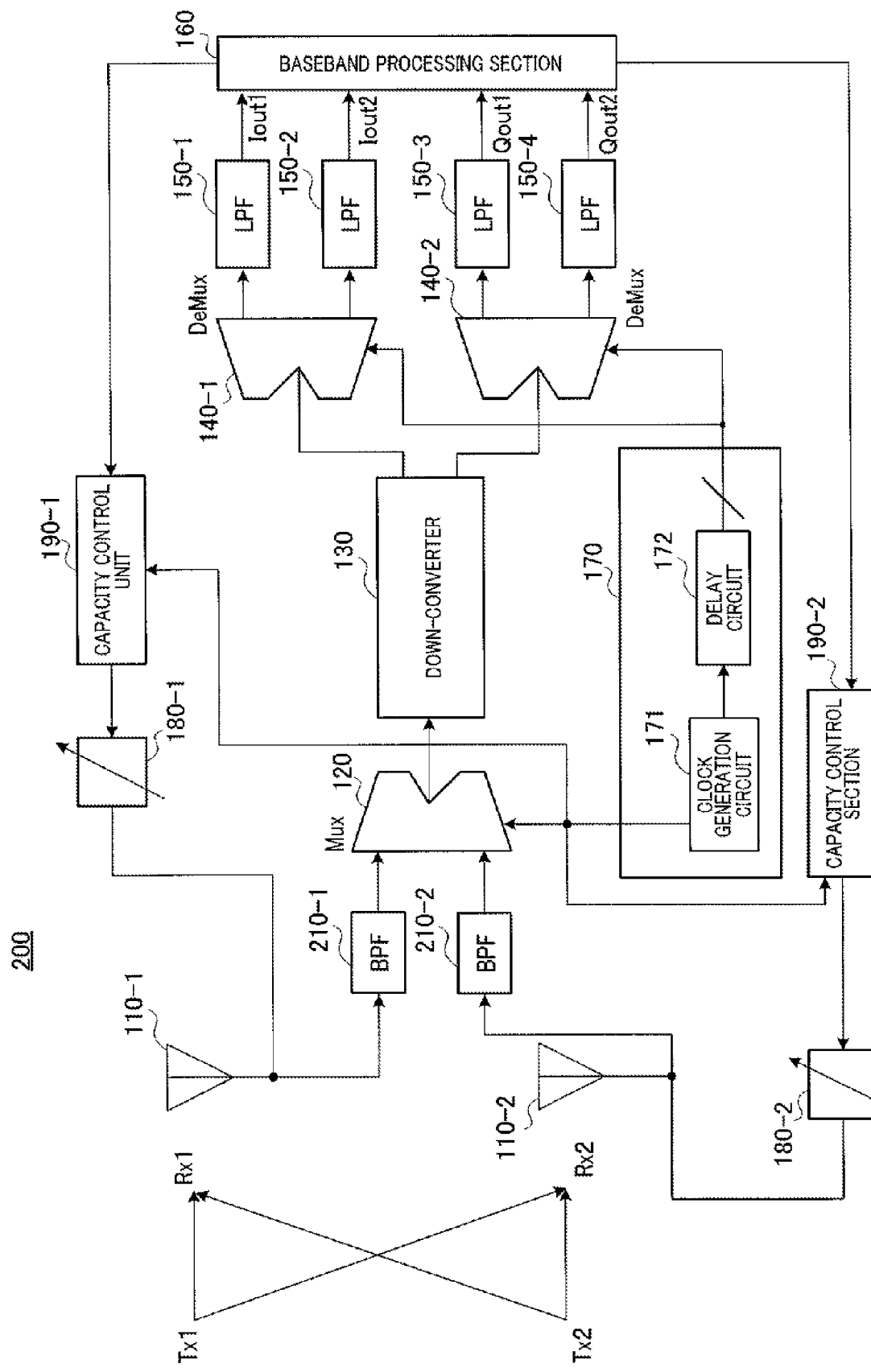
FIG. 4 is a block diagram illustrating a main configuration of a wireless receiving apparatus according to Embodiment 2 of the present invention.

FIG. 4 is a block diagram illustrating the main configuration of a wireless receiving apparatus according to the embodiment of the present invention. In the wireless receiving apparatus according to the present embodiment shown in FIG. 4, the same components as shown in FIG. 3 are denoted by the same reference numerals as in FIG. 3, without their description.

Compared to wireless receiving apparatus 100 according to Embodiment 1, wireless receiving apparatus 200 according to the present embodiment has a configuration that includes band pass filter (BPF) 210-1 between receiving antenna 110-1 and multiplexer 120, and band pass filter (BPF) 210-2 between receiving antenna 110-2 and multiplexer 120.

Band pass filter 210-1 is connected between receiving antenna 110-1 and multiplexer 120 and band pass filter 210-2 is connected between receiving antenna 110-2 and multiplexer 120, and band pass filters 210-1 and 210-2 remove out-of-band reflection interference waves caused by frequency for time-division control of the first switching signal. Thus, the bandwidths of band pass filters 210-1 and 210-2 need to be set greater than the modulated signal bandwidth of desired waves to be received, and to be set smaller than the frequency for time-divisional control of the first switching signal that switches multiplexer 120.

A configuration that disposes a band pass filter downstream of multiplexer 120 for sharing is not recommended because two pieces of independent data arranged time-divisionally by multiplexer 120 undergo an averaging (mixing) effect by the band pass filter downstream of multiplexer 120.

In contrast, band pass filter 210-1 is disposed between receiving antenna 110-1 and multiplexer 120, and band pass filter 210-2 is disposed between receiving antenna 110-2 and multiplexer 120, as shown in FIG. 4, where only the first RF signals received by receiving antenna 110-1 are input to band pass filter 210-1, while the second RF signals received by receiving antenna 110-2 are not input thereto. Consequently, band pass filter 210-1 averages only the first RF signals.

Similarly, only the second RF signals received by receiving antenna 110-2 are input to band pass filter 210-2, while the first RF signals received by receiving antenna 110-1 are not input thereto. As a result, band pass filter 210-2 averages only the second RF signals.

Thus band pass filter 210-1 is disposed between receiving antenna 110-1 and multiplexer 120, and band pass filter 210-2 is disposed between receiving antenna 110-2 and multiplexer 120, as shown in FIG. 4, thereby averaging the first RF signals received by receiving antenna 110-1 and the second RF signals received by receiving antenna 110-2 independently. It is therefore desirable that band pass filters 210-1 and 210-2 have the same filter characteristics and perform common averaging procedures on the first and second RF signals.

As described above, wireless receiving apparatus 200 according to the present embodiment is provided with band pass filters 210-1 and 210-2 between receiving antennas 110-1 and 110-2, and multiplexer 120, respectively. Since the present embodiment thus averages the received first and second RF signals independently, it ensures time-division operation without being affected by the reflection of the out-of-band interference waves, and can have the same effect as Embodiment 1.

Embodiment 3

Figure 5:
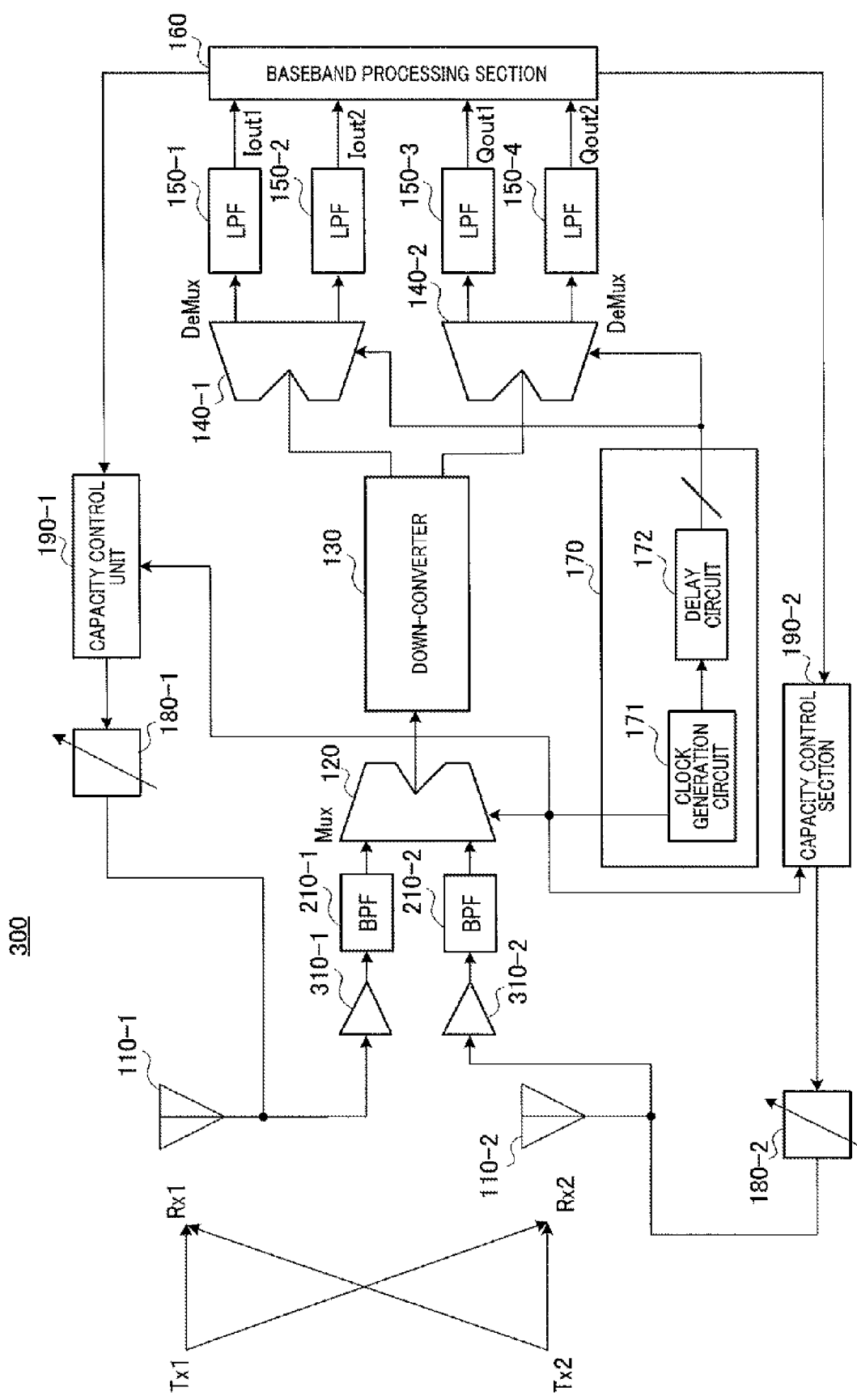
FIG. 5 is a block diagram illustrating a main configuration of a wireless receiving apparatus according to Embodiment 3 of the present invention.

FIG. 5 is a block diagram illustrating the main configuration of a wireless receiving apparatus according to the embodiment of the present invention. In the wireless receiving apparatus according to the present embodiment shown in FIG. 5, the same components as shown in. FIG. 4 are denoted by the same reference numerals as in FIG. 4, without their description.

Compared to wireless receiving apparatus 200 according to Embodiment 2, wireless receiving apparatus 300 according to the present embodiment has a configuration that includes low noise amplifiers 310-1 and 310-2 between receiving antennas 110-1 and 110-2, and between band pass filters 210-1 and 210-2, respectively.

Low noise amplifier 310-1, which is disposed upstream of band pass filter 210-1, amplifies received power (the first RF signal) converted by receiving antenna 110-1.

Low noise amplifier 310-2, which is disposed upstream of band pass filter 210-2, amplifies received power (the second RF signal) converted by receiving antenna 110-2.

Low noise amplifiers 310-1 and 310-2 raise thermal noise levels of the first and second RF signals received by receiving antenna 110-1 and 110-2 by a set gain. Since out-of-band thermal noise is removed by band pass filters 210-1 and 210-2 downstream of low noise amplifiers 310-I and 310-2, respectively, received thermal noise power of the first and second RF signals is reduced to half. Since the received power of the first and second RF signals is reduced to half through time-division, provided low noise amplifiers 310-1 and 310-2 can prevent theoretical SNR degradation of 3 dB.

As described above, wireless receiving apparatus 300 according to the present embodiment is provided with low noise amplifier 310-1 upstream of band pass filter 210-1, and is provided with low noise amplifier 310-2 upstream of band pass filter 210-2. Thus, the one channel of RF signal obtained by time-dividing the first and second RF signals is input to down-converter 130 in the present embodiment, and it can prevent theoretical SNR degradation of 3 dB. The present embodiment can also have the same advantageous effect as Embodiment 2.

Embodiment 4

Figure 6:
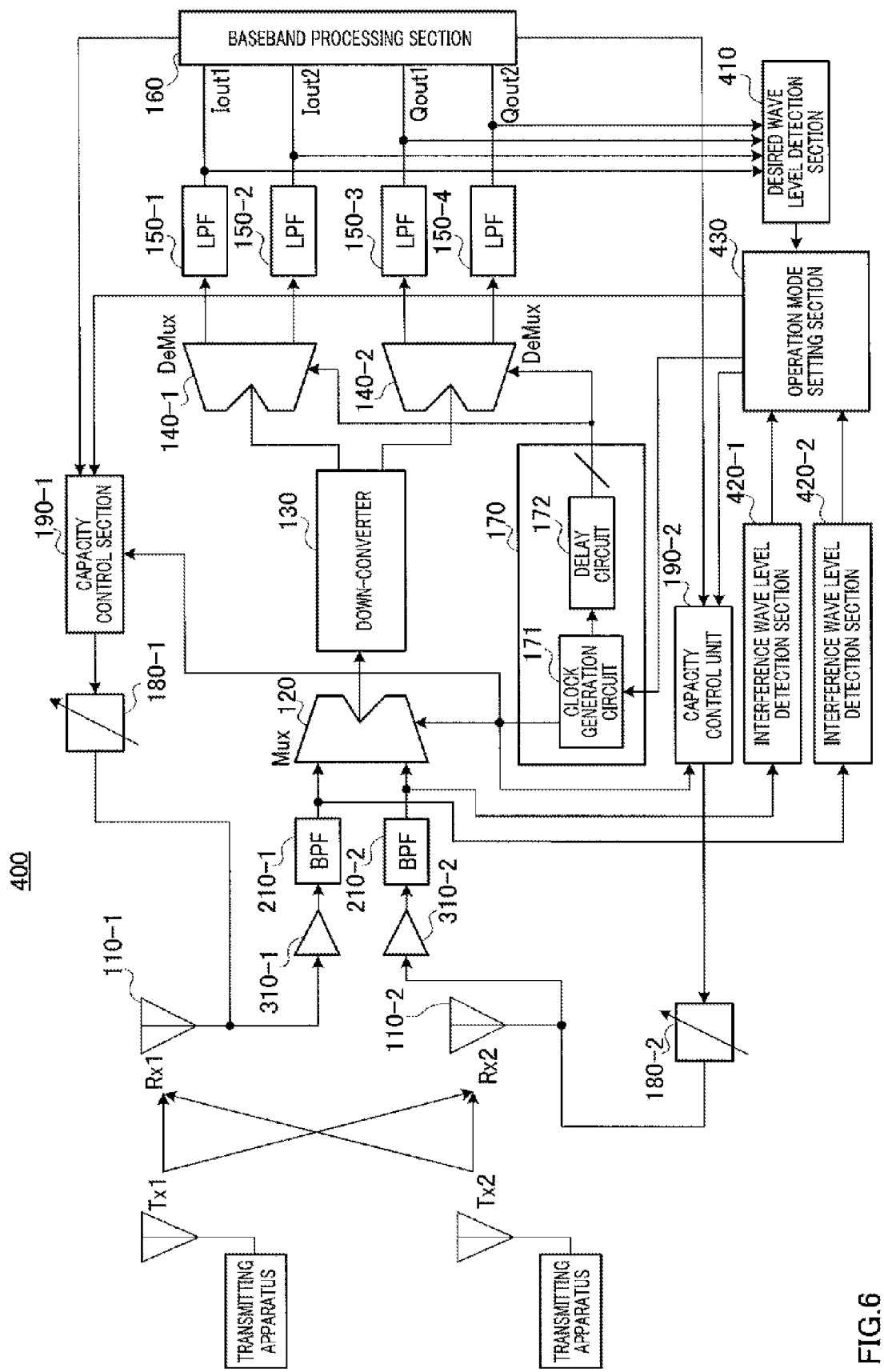
FIG. 6 is a block diagram illustrating a main configuration of a wireless receiving apparatus according to Embodiment 4 of the present invention.

FIG. 6 is a block diagram illustrating the main configuration of a wireless receiving apparatus according to the embodiment of the present invention. in the wireless receiving apparatus according to the present embodiment shown in FIG. 6, the same components as shown in FIG. 5 are denoted by the same reference numerals as in FIG. 5, without their description.

Compared to wireless receiving apparatus 300 according to Embodiment 3, wireless receiving apparatus 400 according to the present embodiment has a configuration that further includes desired wave level detection section 410, interference wave level detection sections 420-1 and 420-2, and Operation mode setting section 430.

Desired wave level detection section 410 detects the reception levels of the desired waves on the basis of the outputs of LPFs 150-1, 150-2, 150-3, and 150-4.

Interference wave level detection sections 420-1 and 420-2 detect the reception levels of the interference waves and the desired waves on the basis of outputs of band pass filters 210-1 and 210-2, respectively.

Operation mode setting section 430 switches wireless receiving apparatus 400 on the basis of the outputs of desired wave level detection section 410 and interference wave level detection sections 420-1 and 420-2 to one of the following modes. The operation modes of wireless receiving apparatus 400 include SIMO, MIMO, and SISO (single input, single output).

In detail, if the reception levels of the desired waves and the interference waves are low, operation mode setting section 430 sets its operation mode to the SIMO mode. Since diversity combining is performed by operating wireless receiving apparatus 400 in the SIMO mode, the reception sensitivity can be increased even if the reception level of the desired waves is low.

If the reception level of the desired waves is high and the reception level of the interference waves is low, operation mode setting section 430 sets its operation mode to the MIMO mode. Operating wireless receiving apparatus 400 in the MIMO mode can increase its throughput if the reception level of the desired waves is high.

If the reception level of the interference waves is high, operation mode setting section 430 sets its operation mode to the SISO mode, and operates wireless receiving apparatus 400 in a normal single mode.

Operation mode setting section 430 has a determination table shown in FIG. 7, for example, and performs control to switch the operation mode based on the determination table when needed. The determined operation mode is fed back to a wireless transmitting apparatus at the communication counterpart.

In addition, if the operation mode is set to SISO, operation mode setting section 430 outputs an instruction signal to stop the provision of the first switching signals to clock generation circuit 171 of switching control section 170 to prevent wireless receiving apparatus 400 from the time-division operation. At the same time, operation mode setting section 430 outputs an instruction signal to stop the provision of the control signal to capacity control sections 190-1 and 190-2. Thus operation mode setting section 430 sets the operation mode based on the reception levels of the desired wave and the interference wave, and performs the on/off control of the time-division operation in wireless receiving apparatus 400 according to the set operation mode.

As described above, operation mode setting section 430 switches the operation mode based on the results of the detected reception levels of the desired waves and the interference waves. If the electric field is low due to a low reception level of desired waves, for example, operation mode setting section 430 sets its operation mode to the SIMO mode. If the electric field is high due to a high reception level of desired waves, operation mode setting section 430 sets its operation mode to the MIMO mode. If strong input interference waves are present due to a high reception level of interference waves, operation mode setting section 430 sets its operation mode to the SIMO mode. These operations lighten the tolerance to aliasing by the out-of-band inference waves, which is an issue of the time-division switching system, and can set the bandwidth of the band pass filters to the same receiving bandwidth as that of an ordinary wireless receiving apparatus. Since the bandwidth of the band pass filters can be set wide in such a manner, the tunable filter that varies the center frequency of the band pass filter according to the channel is not necessary.

The disclosure of Japanese Patent Application No. 2009-295554, filed on Dec. 25, 2009, including the specification, drawings and abstract, is incorporated herein by reference in its entirely.

INDUSTRIAL APPLICABILITY

The wireless receiving apparatus according to the present invention can reduce the number of RF input terminals and decrease the circuit scale compared to a receiving apparatus with an ordinary configuration mounted in parallel, thereby being useful as a radio section of a 3G LIE (3GPP Long Term Evolution) mobile phone or the like. It is also applicable to ISDB-T (Integrated Services Digital Broadcasting-Terrestrial) and the like as not only MIMO but also SIMO, i.e., as maximum-ratio combining diversity.

REFERENCE SIGNS LIST 100, 200, 300, 400: Wireless receiving apparatus
110-1, 110-2: Receiving antenna
120: Multiplexer
130: Down-converter
140-1, 140-2: Demultiplexer
150-1, 150-2, 150-3, 150-4: LPF
160: Baseband processing section
170: Switching control section
171: Clock generation circuit
172: Delay circuit
190-1, 190-2: Capacity control section
180-1, 180-2: Capacity-variable parasitic element
210-1, 210-2: Band pass filter
310-1, 310-2: Low noise amplifier
410: Desired wave level detection section
420-1, 420-2: Interference level detection section
430: Operation mode setting section

The invention claimed is:

1. A wireless receiving apparatus comprising:
a first receiving antenna and a second receiving antenna that convert arrival signals to received power;
a capacity-variable parasitic element connected to the second receiving antenna;
a down-converter that demodulates signals received by the first and second receiving antennas;
a multiplexer that is disposed between the first and second receiving antennas and the down-converter and alternately switches the connection of the first or second receiving antenna and the down-converter in a shorter time than a symbol rate of a modulated signal included in the arrival signal; and
a control section of a radio frequency integrated circuit that outputs a voltage value according to a target capacity value of the capacity-variable parasitic element connected to the second receiving antenna so as to maximize communication capacity of the first receiving antenna when the first receiving antenna and the down-converter are connected, wherein the control section controls a capacity value of the capacity-variable parasitic element at a rate more than a Doppler frequency.

2. The wireless receiving apparatus according to claim 1, further comprising:
- a first band pass filter that is disposed between the first receiving antenna and the down-converter and removes interference waves from a signal received by the first receiving antenna; and
- a second band pass filter that is disposed between the second receiving antenna and the down-converter and removes interference waves from a signal received by the second receiving antenna.

3. The wireless receiving apparatus according to claim 2, wherein:
the first and second band pass filters have the same filter characteristics.

4. The wireless receiving apparatus according to claim 2, further comprising:
- a first amplifier that is disposed upstream of the first band pass filter and amplifies the signal received by the first antenna; and
- a second amplifier that is disposed upstream of the second band pass filter and amplifies the signal received by the second antenna.

5. The wireless receiving apparatus according to claim 1, further comprising:
- a detection section that detects a reception level of desired waves and interference waves using signals received by the first and second receiving antennas; and
- a setting section that sets an operation mode to one of a SISO mode, a MIMO mode, and a SIMO mode based on the detected results by the detection section.

6. The wireless receiving apparatus according to claim 5, wherein:
the setting section sets the operation mode to a SISO mode if a reception level of the interference waves is high, sets the operation mode to a MIMO mode if a reception level of the desired waves is high and if a reception level of the interference waves is low, and sets the operation mode to a SIMO mode if a reception level of the desired waves is low and if a reception level of the interference waves is low.

* * * * *